Patented Oct. 19, 1948

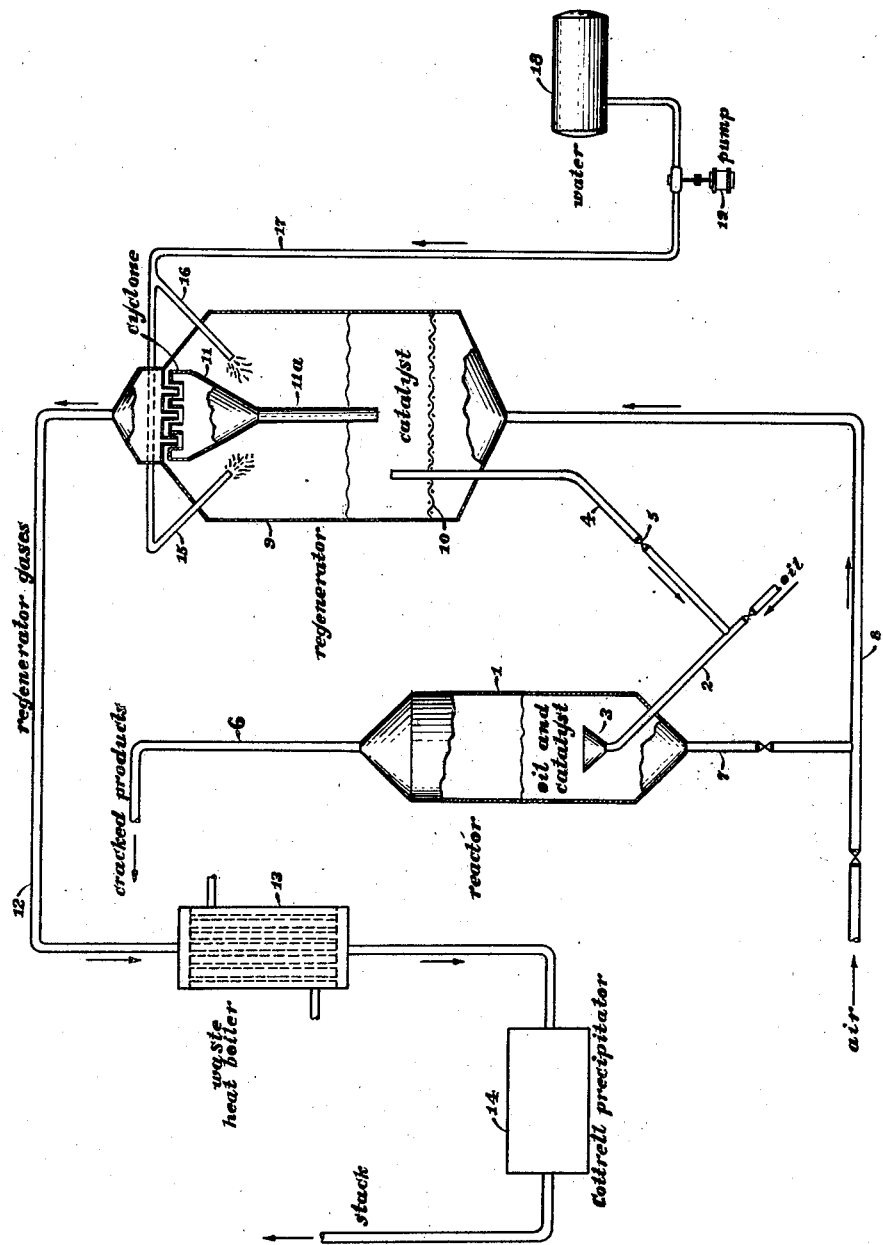

2,451,573

UNITED STATES PATENT OFFICE 2,451,573

FLUID CATALYST REGENERATOR SYSTEM

William A. Myers and William A. Hall, Springfield, Pa., assignors to The Atlantic Refining Company, Philadelphia, Pa., a corporation of Pennsylvania Application May 15, 1943, Serial No. 487,416

1 Claim. (Cl. 252—417)

This invention relates to the catalytic cracking of hydrocarbon oils and more particularly to an improved catalyst regenerating system for catalytic cracking units involving the use of a fluid type catalyst.

In ordinary catalytic cracking, the catalyst is in the form of small pellets contained in a catalyst chamber or cracking reactor. The oil being worked is continuously passed through the reactor, usually as a vapor, until such time as the catalyst pellets become so coated with carbon that their activity is materially affected at which time the operation is interrupted and the catalyst regenerated by burning off the carbon with hot air. Fluid catalyst cracking improves over ordinary catalytic cracking in that the process need not be interrupted for the purpose of regenerating the catalyst.

In fluid catalyst cracking, the catalyst is not in the strict sense a fluid as a gas or liquid but is actually a dry argillaceous material such as acid activated bentonite, fuller's earth, bauxite, silica, or a silica-alumina mixture or complex. The catalyst is so finely ground or pulverized, however, that when buoyed up, as in a stream of gas, the resulting mixture obeys the laws of fluid flow, and can be forced through straight or curved piping just as if it were really a liquid.

The conventional fluid catalyst plant includes two sections which are somewhat similar in operation and often in appearance. The first section comprises a reactor into which the dust catalyst and hot oil vapors to be cracked are introduced while the second comprises the catalyst regenerator wherein the spent catalyst from the reactor is burned free of carbon with air. A tangential or cyclone separator is positioned either within the regenerator or in a separate chamber having communication therewith and serves to recover catalyst from the flue gases resulting from the burning operation.

In the operation of fluid catalyst plants, shutdowns may be necessary to replace or repair the cyclone separators and other parts of the catalyst regenerating system including the regenerator gas exit lines damaged by excessively high flue gas temperatures.

It is a principal object of the invention to avoid these excessive flue gas temperatures to the end of providing a fluid catalyst cracking system which is more economical in operation than systems heretofore disclosed.

The present invention whereby the foregoing and other objects are achieved will be readily understood by reference to the accompanying drawing which diagrammatically illustrates the invention as applied to a continuous fluid catalyst cracking system in which the means for effecting recovery of catalyst from the flue gases are contained within the catalyst regenerator.

In the drawing, the numeral 1 indicates a catalytic reactor into which a suitable oil fraction, as a gas oil fraction, is introduced either as a liquid or as a vapor, but preferably as a vapor, via the pipe 2. Pipe 2 terminates in a perforated distributor head 3 positioned within the reactor 1 and communicates at its lower end with a pipe 4 provided with a valve 5. Fresh or regenerated catalyst in controlled amounts is admitted to the pipe 2 by means of valve 5 and is fed to the reactor with the oil stream.

The cracked products resulting from the reaction in reactor 1 are continuously withdrawn via a pipe 6 which may lead to a cyclone separator or a dust precipitator, not shown, by which means catalyst lost with the cracked products is recovered. If desired, reactor 1 may itself comprise a cyclone separator for effecting separation of catalyst from the cracked products.

To the end of preventing the catalyst particles, as a consequence of the reaction in reactor 1, from becoming so coated with carbon as to result in their inactivation, catalyst is continuously withdrawn from the reactor through a valve-controlled standpipe 7 and admitted to a pipe 8 through which it is propelled by a constant blast of air to a catalyst regenerator 9. Regenerator 9 is provided with a grid 10 through which pipe 4 projects and which operates to distribute the incoming catalyst in a substantially uniform manner throughout the entire cross-section of the regenerator. This promotes the maximum contact between the catalyst particles and the air and increases the efficiency of the burning operation. The catalyst about the open end of the pipe 4 is relatively carbon-free and it is this material, as indicated, which is recirculated through the reactor.

Positioned within the regenerator 9 as shown is a cyclonic apparatus 11 through which the regenerator or flue gases pass before leaving the regenerator via line 12. The cyclonic apparatus which comprises a depending leg 11a, functions to separate entrained catalyst which would otherwise be carried out of the regenerator by the flue gases, the separated catalyst dropping down the leg to the bottom portion of the regenerator. Leg 11a is extended to a point below the level of the dense phase of the catalyst, delineated by the wavy line, in order to prevent flue gases from entering the leg and interfering with the descent of the separated catalyst.

Exit line 12 is shown as leading to a boiler 13 wherein the heat contained in the flue gases is utilized. It will be understood that boiler 13 could be a standard heat exchanger or any other type of heat exchange apparatus.

From boiler 13 the gases are led to a Cottrell precipitator 14, or the functional equivalent, in which substantially the last traces of entrained catalyst are recovered. The gases may thereafter be used as for chemical synthesis or any other useful purpose, or vented to the atmosphere as shown.

In the operation of the system as thus far described, excessive temperatures may prevail in the regenerator system above and beyond the dense phase of the catalyst. These excessive temperatures are due to what has been called "after burning" which results from reaction between the oxygen and carbon monoxide in the flue gases and which is most extensive after the major portion of the catalyst has been separated from the flue gases. Apparently when the flue gases are heavily loaded with catalyst, the heat contained in the catalyst is so equalized that none of the catalyst particles become sufficiently hot to cause the reaction. However, when only a few isolated particles of catalyst are suspended in the flue gases there is no equalization with the result that the particles may ultimately become hot enough to ignite the gases.

According to the invention, after-burning and the resulting high temperatures are controlled by the introduction of water into the regenerating system at a point above the level of the dense phase of the catalyst in the regenerator. In the embodiment disclosed by the drawing, the water is delivered through pipes 15 and 16 which extend inwardly of the walls of the regenerator and which are provided with suitable spray heads, fog nozzles, or the like. Pipes 15 and 16 may be supplied by a common feed pipe 17 from a water source 18, the quantity of water delivered to the regenerator being dependent on the temperature at which it is desired to maintain the flue gases. Pump 19, by means of which water is forced through common feed pipe 17 and thence through pipes 15 and 16, is preferably of the positive displacement type for accurate water control.

The temperature at which the flue gases are maintained may vary considerably but in all cases should be below that at which damage to the apparatus may occur. Usually little if any damage to equipment will result if the gases are maintained at a temperature, for example, of 1000–1150° F. (The temperatures in the catalyst phase in the regenerator range from about 950° F. to 1150° F.)

By extending pipes 15 and 16 inwardly of the walls of the regenerator, the steam developed in the pipes increases the pressure drop across the orifices in the spray head and results in better and more complete distribution of the water. This is especially advantageous where the regenerator is of large cross-section and where if water alone were used the quantity required to obtain adequate distribution might operate not only to prevent after-burning but also to reduce the temperature in the lower portion of the regenerator to such an extent that regeneration of the catalyst would be incomplete. It will be immediately seen that extremely fine orifices are precluded since they would soon become plugged with the dust catalyst.

It is to be understood that the present invention is not limited to the embodiment shown by the drawing, and particularly that it is applicable irrespective of whether the tangential separators are housed within the regenerator or in a separate chamber. In the latter event, water may be introduced into either one or both of the regenerator and the housing for the separator.

It should be further understood that while the invention is perhaps preferably executed with water alone where the regenerator is of small cross-section and with both water and steam where the regenerator is of large cross-section, steam alone may be used in either case. In using steam it is believed that the cooling effect thereof is of less importance than its diluent effect, i. e., its action in maintaining the molecules of carbon monoxide and oxygen separated from one another thereby preventing their reaction. As used in the appending claims the word "water" is intended as encompassing steam as well as water itself.

We claim:

The process for regenerating finely divided solid material containing combustible deposits which comprises passing an oxidizing gas upwardly through a regeneration zone containing said finely divided solid material at a controlled rate to maintain a dense turbulent layer of said finely divided solid material in the bottom portion of said regeneration zone, maintaining the temperature within the regeneration zone sufficient to burn said combustible deposits, and injecting steam into the stream of regeneration gas, associated with minor amounts of solid material containing combustible deposits, leaving said dense layer of fine divided material to materially reduce the temperature thereof and avoid secondary combustion above said catalyst layer.

WILLIAM A. MYERS.
WILLIAM A. HALL.

REFERENCES CITED

The following references are of record in the file of this patent:

UNITED STATES PATENTS

| Number | Name | Date |
|---|---|---|
| 2,265,964 | Carpenter | Dec. 9, 1941 |
| 2,320,562 | Bransky | June 1, 1943 |
| 2,327,175 | Conn | Aug. 17, 1943 |
| 2,356,680 | Marancik et al. | Aug. 22, 1944 |
| 2,367,351 | Hemminger | Jan. 16, 1945 |
| 2,379,734 | Martin | July 3, 1945 |
| 2,424,467 | Johnson | July 22, 1947 |